Jan. 20, 1970  D. S. CUSHING  3,490,486
CONTROL MEANS FOR AN AUTOMATIC DISHWASHER
Filed June 7, 1968  2 Sheets-Sheet 1

INVENTOR.
DONALD S. CUSHING
BY
HIS ATTORNEY

Jan. 20, 1970  D. S. CUSHING  3,490,486
CONTROL MEANS FOR AN AUTOMATIC DISHWASHER
Filed June 7, 1968  2 Sheets-Sheet 2

INVENTOR.
DONALD S. CUSHING
BY
HIS ATTORNEY

United States Patent Office 3,490,486
Patented Jan. 20, 1970

3,490,486
CONTROL MEANS FOR AN AUTOMATIC DISHWASHER
Donald S. Cushing, Louisville, Ky., assignor to General Electric Company, a corporation of New York
Filed June 7, 1968, Ser. No. 735,347
Int. Cl. A47l 21/18; F16k 15/46
U.S. Cl. 137—387   9 Claims

ABSTRACT OF THE DISCLOSURE

Improved means for controlling the level of liquid in the washing enclosure of an automatic dishwasher having means including an electrically-operated inlet valve for supplying liquid to the washing enclosure. The control means comprise a weight-sensitive electric switch having its sensor fluid-connected to the washing enclosure and being operable between a first position opening and a second position closing the inlet valve. The switch sensor is surrounded by casing means forming a control chamber that is considerably smaller than the washing enclosure. The chamber has a standpipe provided with an inlet opening to the enclosure at an elevation equal to the desired level of liquid to be supplied to the washing enclosure. The switch sensor is operable from its first position to its second position in response to liquid overflowing into the control chamber through the chamber inlet opening.

BACKGROUND OF THE INVENTION

This invention relates generally to automatic dishwashers and, more particularly, to improved means for controlling the level of liquid in the washing enclosure of an automatic dishwasher.

Conventional automatic dishwashers generally include a washing enclosure, rack means for supporting articles, such as dishes and the like, to be washed within the enclosure, means including an electrically-operated inlet valve for supplying liquid, such as water, to the enclosure, spray means in the enclosure for affecting a washing or rinsing action on the articles by ejecting pressurized liquid thereon, and an electrically-operated motor-pump assembly that is alternatively operable to circulate liquid from the enclosure through the spray means or to discharge liquid from the enclosure to a drain.

The operation of such conventional dishwashers typically involves several separate fills or charges of the liquid into the washing enclosure, followed by operation of the motor-pump assembly to effectuate a washing or rinsing action and subsequent drainage of each charge. Such operation generally includes, in sequence, one or more pre-rinse periods, a wash period, and one or more post-rinse periods. The last post-rinse period is frequently followed by a drying period wherein the articles are heated by an electrical heating element to facilitate their drying.

Of course, control means must be provided to sequentially energize and de-energize the various electrically-operated components of such dishwashers to carry out the operational cycle. Usually, a sequence control device having a timer motor and several cam-operated switches is provided, with each switch controlling one of the components. Although such a sequence control device has proven successful and is in general use today, it is a rather expensive component of the dishwasher, due in part to the large number of cams and switches involved. Of course, the greater number of switches and cams which are involved increases the complexity of the control device and thus increases the likelihood of need for maintenance.

The amount of liquid in each charge admitted to the washing enclosure must be maintained within certain limits to assure, on the other hand, that adequate liquid is present to effectuate suitable wash or rinse action, and on the other hand, to avoid overflow or flooding which may result if an excessive amount of liquid is admitted. Most dishwashers manufactured today provide a timed fill. That is, the sequence control device maintains the inlet valve open for a predetermined length of time which is calculated to provide a given level of liquid within the aforementioned limits. This requires that the timer motor and the inlet valve be accurate, and, hence, expensive.

As will become evident as this description proceeds, the present invention provides an improved control means for an automatic dishwasher which is greatly simplified in comparison to the heretofore available control means, and yet performs the functions of such more complex means. Moreover, the control means of the present invention allows the use of a less accurate timer motor and inlet valve since filling of the liquid into the washing enclosure is not subject to the timed accuracy of the sequence control means.

SUMMARY OF THE INVENTION

This invention is related to an automatic dishwasher having a washing enclosure and means including an electrically-operated inlet valve for supplying liquid to the enclosure. More specifically, this invention provides improved means for controlling the level of liquid supplied to the washing enclosure. Basically these improved control means comprise a weight-sensitive electrical switch having its sensor fluid-connected to the washing enclosure and being operable between a first position opening and a second position closing the electrically-operated inlet valve. The switch sensor is surrounded by casing means forming a control chamber that is considerably smaller than the washing enclosure. The control chamber has a standpipe provided with an inlet opening communicating with the washing enclosure at an elevation equal to the desired level of liquid to be supplied to the washing enclosure. The switch is operable from its first position to its second position in response to liquid overflowing into the control chamber through the chamber inlet opening.

In addition, it has been found desirable to provide valved means for draining liquid from the control chamber when liquid is drained from the washing enclosure. In one presently preferred form of the present invention, these chamber drain means comprise a drain opening from the control chamber to the washing enclosure that is provided in the chamber below the chamber inlet opening and a float valve member. The float valve member operates in response to admission of liquid into the washing enclosure to seal the control chamber drain opening and operates to open the control chamber drain opening in response to removal of liquid from the washing enclosure.

BRIEF DESCRIPTION OF THE DRAWINGS

The present invention is illustrated in the accompanying drawings, wherein.

DESCRIPTION OF THE PREFERRED EMBODIMENT

Figure 1:
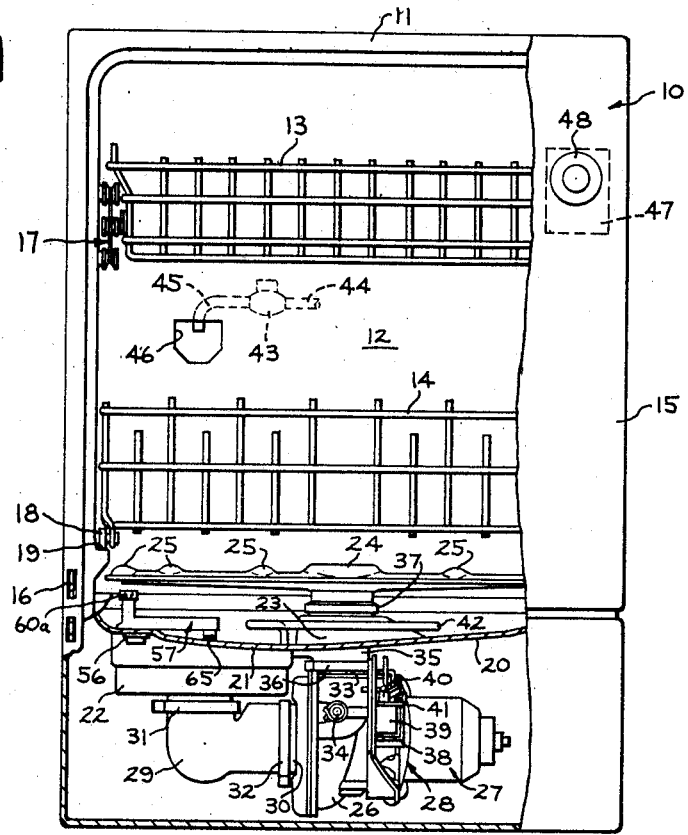
FIGURE 1 is a front elevational view, partly cut away to show details, of an automatic dishwasher employing the present invention.

Referring now to the drawings particularly to FIGURE 1 thereof, there is illustrated an automatic dishwasher 10 having an outer cabinet 11 defining therein washing enclosure 12. Disposed within the washing enclosure 12 are upper and lower racks 13 and 14, which are adapted to receive and support dishes or other articles to be washed within washing enclosure 12. A door 15 is provided in one wall of the cabinet 11, pivotal about a hinge means 16 to provide access to the washing enclosure 12. When the door 15 is pivoted downwardly, the upper rack 13 can be partially withdrawn from the upper portion of the washing enclosure 12 by means of a slide and roller system 17 provided at each side of the upper rack 13 and slidably supporting the upper rack 13 on the inner wall of the cabinet 11. Similarly, the lower rack 14 can be at least partially withdrawn from the lower portions of the washing enclosure 12 by means of a roller 18 which rides upon a track 19 provided at each side of the cabinet 11.

The lower extremity of the washing enclosure 12 is defined by a bottom wall 20 which gradually slopes to a low point 21 near the center of the dishwasher. Disposed below the low point 21 is a sump 22 which may be formed integrally with the bottom wall 20 or which may be a separate element secured thereto. Projecting upwardly from the bottom wall 20 near the center of the washing enclosure 12 is a pedestal 23 which rotatably supports a spray device 24. The spray device 24 has a plurality of orifices 25 through which wash fluid is ejected to effectuate a washing action upon articles supported by racks 13 and 14. At least one of the orifices 25 is directed such that the reaction force created by fluid passing therethrough causes rotation of the spray device 24 about a generally vertical axis.

Wash fluid is propelled into the spray device 24 by a pump 26 which is driven by a uni-directional electric motor 27. The pump 26 and motor 27 are secured together to form a motor-pump assembly 28 which is suitably supported from the bottom wall 20. A flexible boot or conduit 29 interconnects the sump 22 to the inlet 30 of the pump 26. The boot 29 is secured to the sump 22 by means of a clamp 31 and is similarly secured to the inlet 30 of the pump 26 by means of a clamp 32.

Disposed within the housing of the pump 26 is an impeller (not shown). The pump first outlet 33 is connected to a flexible conduit 35 by means of a clamp 36. The conduit 35 extends up through the pedestal 23 to a fitting 37 upon which the spray device 24 is rotatably mounted, it being understood that fitting 37 is secured to the pedestal 23. With this arrangement, water or any other fluid, entering the pump 26 through its inlet 30 will be pumped either into the spray device 24 through the pump first or spray outlet 33 or discharged from the dishwasher 10 through pump second or drain outlet 34 to the sewer system.

An outlet valve mechanism is provided to selectively control through which of the outlets 33 or 34 fluid will egress from the pump 26. The outlet valve mechanism includes frame 38 suitably secured to the exterior of the housing of the pump 26. The frame 38 carries a solenoid 39 having electrical terminals and an armature 40. The armature 40 is adapted to be drawn into the solenoid 39 when the solenoid is energized by the presence of electrical energy across its terminals. The armature 40 is suitably linked to a valve element (not shown) which is pivotally mounted within the housing of the pump 26. The valve element is biased by a spring 41, connected between it and the frame 38, towards a "circulate" position to seal off the pump second or drain outlet 34 and thus direct fluid from the pump 26 through the pump first or spray outlet 33 to the spray device 24 when the solenoid 39 is de-energized. When the solenoid 39 is energized, the armature 40 is drawn into the solenoid 39 and the valve element is pivoted through its linkage with the armature 40 towards a "drain" position to seal off the pump first or spray outlet 33 and direct fluid from the pump 26 through the pump second or drain outlet 34 to the household sewer system. The foregoing outlet valve mechanism is described in greater detail along with other refinements thereof in U.S. Patent No. 3,367,368, issued Feb. 6, 1968, to Thomas E. Jenkins and assigned to the General Electric Company, assignee of the present invention.

An electrical heating element 42 is supported in spaced relationship from the washing enclosure bottom wall 20 and may be employed to heat the wash fluid in the washing enclosure, although not so adapted in this application, and to facilitate drying of articles supported by the racks 13 and 14 upon completion of the washing and post-rinse operations.

Means, including an electrically-operated inlet valve 43, are provided to supply water, or other liquids, to the washing enclosure 12. The inlet valve 43 is supported on a bracket (not shown) fastened by welding or other suitable means to the exterior of the side wall of the outer cabinet 11 at an elevation preferably between the racks 13 and 14. The inlet port of the inlet valve 43 is connected to a conduit 44 which communicates with a normal household plumbing system (not shown) and the outlet port of the inlet valve 43 is connected to a conduit 45 which communicates with the washing enclosure 12 through an inlet funnel 46 formed as an embossment on the side wall of the cabinet 11. The conduit 45 is spaced from the funnel 46 so as to provide the conventional air-gap that is required by plumbing codes.

The liquid inlet valve 43 is operated by a solenoid 43a. When the solenoid 43a is energized, the inlet valve 43 is fully opened, and, conversely, when the solenoid 43a is deenergized, the inlet valve 43 is fully closed. Obviously, the rate at which liquid is admitted to the washing enclosure 12 through the liquid inlet valve 43 is dependent upon the pressure of the liquid supplied to the inlet port of the valve 43 and upon the length of time that the valve 43 is opened. With prior-art control systems, which relied on timed opening of the inlet valve 43, it has been necessary that the valve 43 be quite accurate and that means be provided for maintaining the pressure of the liquid supplied to the inlet port of the valve 43 substantially constant in order to obtain accurate control of the level of the liquid supplied to the washing enclosure 12. As will be evident from the description which follows below, the control system of the present invention permits the use of a less accurate valve and allows the elimination of liquid supply pressure control means in conjunction with the liquid inlet valve 43.

A sequence control means 47, having a manually operable knob 48, is conveniently positioned on the door 15. The sequence control means 47 is disposed within the door 15 and the knob 48 projects out through the door front wall to be conveniently manipulated by the operator of the dishwasher.

Figure 3:
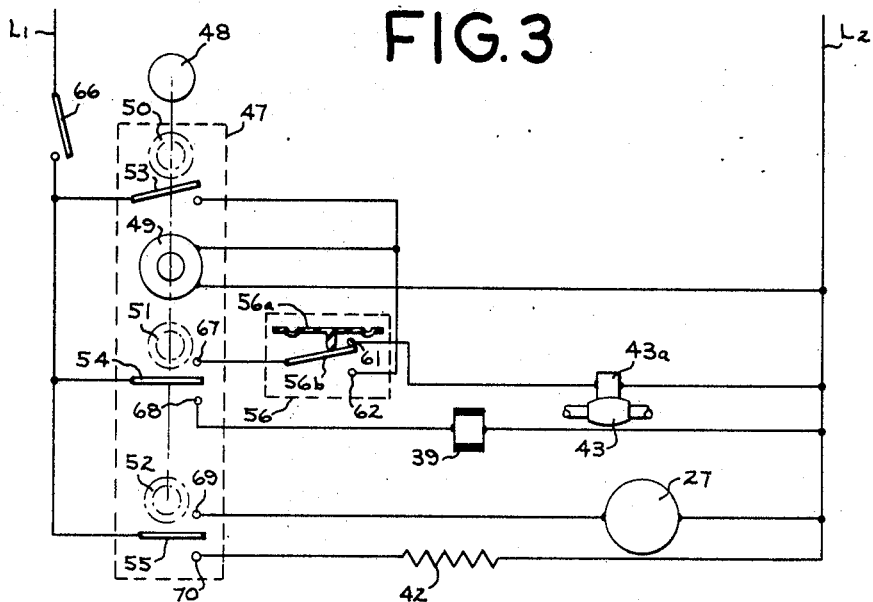
FIGURE 3 is a schematic representation of the electrical circuitry of the control system of the present invention.

Referring now to FIGURE 3, there is illustrated schematically the electrical circuitry of a presently preferred form of the control means of the present invention. As can be seen, the sequence control means 47 includes a timer motor 49, which, in a conventional sequence control device would comprise a synchronous electric motor due to its accuracy, but in accordance with the present invention may comprise a less accurate motor, such as a "shaded pole" motor. The timer motor 49 drives, through a direct mechanical linkage, three cams 50–52 which respectively control the operation of three switches 53–55. A weight-sensitive fill switch 56 is electrically connected to the switch 54 and to the liquid inlet valve 43.

Figure 2:
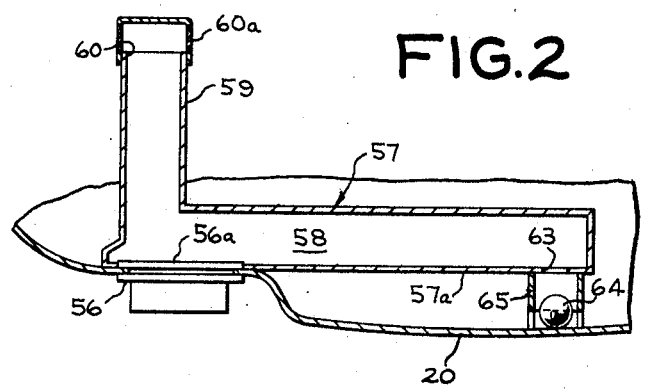
FIGURE 2 is an enlarged detail view of a weight-sensitive switch employed in the dishwasher of FIGURE 1.

As best illustrated in FIGURES 1 and 2, the fill switch 56 is preferably attached to the washing enclosure bottom wall 20 with its sensor 56a in fluid communication with the interior of the washing enclosure 12. Casing means 57 are provided within the washing enclosure 12 to form a control chamber 58 surrounding the switch sensor 56a that is considerably smaller than the washing enclosure. Typically, the volume of the control chamber 58 is made about 1% of the volume of liquid desired to be admitted to the washing enclosure 12. The control chamber 58 has a standpipe 59 which is provided with an inlet opening 60 to the washing enclosure 12 at an elevation equal to the desired level of liquid to be supplied to the washing enclosure through the inlet valve 43. As shown in FIGURE 3, the fill switch 56 is a single pole double throw switch of a well-known "diaphragm" type that has a movable contact member 56b that is normally biased into a first position in which it engages a fixed terminal 61 and is moved into a second position (not shown) in which it engages another fixed terminal 62 in response to weight applied to the sensor 56a by liquid overflowing from the washing enclosure 12 and into the control chamber 58 through the control chamber inlet opening 60. As illustrated in FIGURES 1 and 2 the control chamber inlet opening 60 may be covered by a cap screen 60a or similar means.

Preferably, valved drain means are provided for draining liquid from the control chamber 58 when liquid is drained from the washing enclosure 12, in order that the fill switch sensor 56a may then be restored to its first position. As best shown in FIGURE 2, these valved drain means comprise a drain opening 63 from the control chamber 58 to the washing enclosure 12 and check valve means for controlling the opening and closing of the chamber drain opening 63. As shown, the chamber drain opening 63 is located well below the chamber inlet opening 60, being formed in the bottom wall 57a of the casing means 57, which wall 57a is, in turn, spaced above the washing enclosure bottom wall 20. The check valve means comprise a buoyant ball or float valve member 64 that is mounted for vertical movement in the space between the opening 63 and the washing enclosure bottom wall 20. Guide means in the form of a slotted tube 65 is provided to restrain the movement of the ball 64 substantially to the vertical.

Since the electrical connections among the various components of the control system schematically represented in FIGURE 3 can best be appreciated from a study of FIGURE 3, a detailed element by element verbal description of the connections will not be given here.

Figure 4:
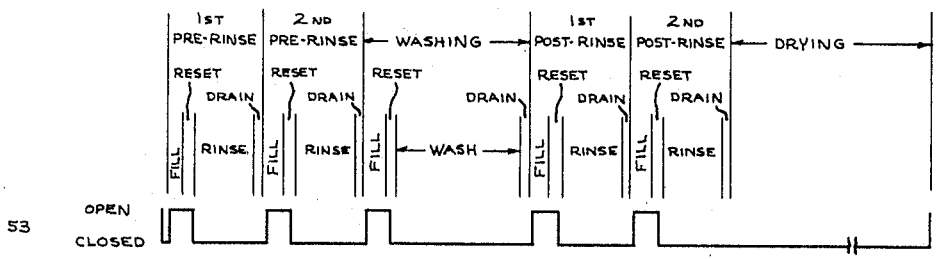
FIGURE 4 is a schematic representation of the action of the switches in the circuitry of FIGURE 3 in providing a presently preferred operational sequence of the dishwasher.

Referring now especially to FIGURES 3 and 4, a description of the operation of the presently preferred embodiment of the control system of the present invention will now be given as it relates to a complete operation of the dishwasher 10 illustrated in FIGURES 1 and 2. As previously noted, this control system comprises the sequence control means 47 which includes a low cost electric timer motor 49 that drives three cams 50–52 which control, respectively, three switches 53–55, and the control system further includes the weight-sensitive fill switch 56 which is electrically connected to the liquid inlet valve 43 and to the switch 54. The timer knob 48 and the cams 53–55 are, of course, mechanically interconnected in a well-known manner.

Electric power is introduced into the control system through power lines L1 and L2. A master switch 66 is operative with closing of the door 15 such that the control system cannot be energized until the door 15 is securely closed. Once the door 15 has been secured in its closed position, the knob 48 is manipulated to initiate operation of the dishwasher 10 by manual rotation thereof a few degrees. This rotates the cam 50 to close the switch 53 and energize the timer motor 49 which commences rotation of all three of the cams 50–52. The cam 51 then moves the switch 54 into engagement with terminal 67 and the liquid inlet valve 43 is energized or opened to admit liquid to the washing enclosure 12 through the funnel 46 since the fill switch member 56b is engaged with terminal 61 due to the absence of liquid in the control chamber 58. The cam 50 now opens the switch 53 and de-energizes the timer motor 49, which interrupts or stops the rotation of all three of the cams 50–52. As the liquid thus admitted by the inlet valve 43 fills the pump 26, conduit 29 and sump 22, it will rise into the bottom of the washing enclosure 12 and float the buoyant ball 64 (FIGURE 2) into liquid-sealing engagement with the control chamber drain opening 63. The inlet valve 43 will remain open until the liquid admitted by it into the washing enclosure 12 overflows into the control chamber 58 through the control chamber inlet opening 60. The weight of the overflowing liquid will then depress or move the fill switch sensor 56a to its second position, disengaging movable member 56b from the terminal 61 and engaging it with the terminal 62, whereupon the inlet valve 43 will be de-energized closed to stop admission of liquid to the washing enclosure 12 and the timer motor 49 will be re-energized through the switch 56 to resume rotation of all three of the cams 50–52.

Upon the resumed rotation of the cams 50–52, the cam 50 recloses or resets the switch 53 to continue rotation of the cams 50–52 by the timer motor 49. The cam 51 moves the switch 54 to a neutral position between terminals 67 and 68, and the cam 52 moves the switch 55 to engage the terminal 69 and energize the pump motor 27. The pump 26 then operates to circulate the liquid from the washing enclosure 12 through the pump spray outlet 33 to the spray device 24 and onto the articles, rinsing or washing them for a pre-determined time period. It should be noted that even though this operation of the pump 26 usually causes the level of liquid to drop below the control chamber drain opening 63 and thus causes draining of the chamber 58 and consequent return of the fill switch sensor 56a to its first position engaging the movable member 56b with the terminal 61, the liquid inlet valve 43 will remain closed since the switch 54 will be held disengaged from the terminal 67 by the cam 51.

Following the expiration of the pre-determined rinsing or washing period, there now follows a drain period, which is initiated by the cam 51 moving the switch 54 into engagement with the terminal 68 to energize the pump solenoid 39. The energized solenoid 39 moves the pump valve element to open the pump drain outlet 34 and close the pump spray outlet 33. The cams 50 and 52 respectively hold the switch 53 closed and hold the switch 55 engaged with the terminal 69. Hence, both the timer motor 49 and the pump motor 27 remain energized and the pump 26 operates to remove or drain substantially all of the liquid from the dishwasher 10 through the pump drain outlet 34 and into the sewer system. Of course, this drainage of the dishwasher 10 results in complete drainage of the control chamber 58. Thus, the liquid weight will be removed from the fill switch sensor 56a, which will then return to its first position engaging the movable member 56b with the terminal 61.

Upon expiration of the pre-determined drain period, the rotating cams 50–52 operate in the following manner. The cam 52 moves the switch 55 to a neutral position between the terminal 69 and terminal 70 and de-energizes the pump motor 27. The cam 51 moves the switch 54 from the engagement with the terminal 68 and into engagement with the terminal 67. This de-energizes the solenoid 39 and allows the spring 41 to move the pump valve element to close the pump drain outlet 34 and to open the pump spray outlet 33. The cam 50 then opens the switch 53, de-energizing the timer motor 49 and stopping rotation of all three of the cams 50–52.

Since the switch 54 now engages the terminal 67 and the fill switch movable member 56b engages the terminal 61, the liquid inlet valve 43 will be energized or opened to again admit liquid to the washing enclosure 12.

A review of FIGURE 4 will show that the foregoing sequence of events may be repeated several times, and, in the preferred form, would be performed a total of five times. The first two times would provide pre-rinses, the third time would provide an elongated wash wherein detergent is added to the liquid by means of a dispenser (not shown), and the last two would provide post-rinses.

The cams 50–52 are so configured to operate in the following manner after expiration of the drain period of the last post-rinse. The cam 50 retains the switch 53 closed to energize the timer motor 49 and continue rotation of the cams 50–52 until completion of the remainder of the operational cycle, whereupon the switch 53 will be opened by the cam 50. The cam 51 holds the switch 54 in a neutral position between the terminals 67 and 68 for the remainder of the operational cycle. The cam 52 engages the switch 55 with the terminal 70, energizing the heating element 42 until the completion of the remainder of the operational cycle, whereupon it returns the switch 55 to the neutral position between the terminals 69 and 70.

Thus, the aforedescribed invention provides an improved control system for an automatic dishwasher that is greatly simplified in that only three timer operated switches are involved and the timer motor may be of a much less expensive type than the accurate synchronous motor which is conventionally required in such control systems. Furthermore, positive measured fill of each charge of liquid supplied to the dishwasher is provided.

As will be evident from the foregoing description, certain aspects of the invention are not limited to the particular details of construction of the examples illustrated and it is contemplated that various other modifications or applications will occur to those skilled in the art. For example, the weight-sensitive switch 56 obviously might be of a float-type rather than the diaphragm type illustrated.

What I claim as new and desire to secure by Letters Patent of the United States is:

1. In an automatic dishwasher having a washing enclosure and means including an electrically-operated inlet valve for supplying liquid to the enclosure, liquid level control means comprising:
   (a) a weight-sensitive electric switch electrically connected to the inlet valve and having its sensor fluid-connected with the washing enclosure,
   (b) said switch sensor being operable between a first position opening and a second position closing the inlet valve, and
   (c) casing means forming a control chamber surrounding said switch sensor that is considerably smaller than the washing enclosure,
   (d) said control chamber having a standpipe provided with an inlet opening communicating with the washing enclosure at an elevation equal to the desired level of liquid to be supplied to the washing enclosure,
   (e) said switch sensor being operable from said first position to said second position in response to liquid overflowing into said control chamber through said chamber inlet opening, and
   (f) means operating to drain liquid from said control chamber when liquid is drained from the washing enclosure.

2. The invention of claim 1, wherein said drain means comprise:
   (a) a drain opening from said control chamber to the washing enclosure that is provided in said chamber below said chamber inlet opening; and
   (b) check valve means for controlling the opening and closing of said drain opening,
   (c) said check valve means being operable in response to admission of liquid into the washing enclosure to seal said control chamber drain opening and being operable in response to removal of liquid from the washing enclosure to open said control chamber drain opening.

3. The invention of claim 2, wherein said check valve means comprise float valve means.

4. The invention of claim 3, wherein:
   (a) said control chamber drain opening is spaced above the washing enclosure bottom wall; and
   (b) said float valve means include buoyant member mounted for movement in the space between said control chamber drain opening and the enclosure bottom wall.

5. The invention of claim 1, further including electrically-powered sequence control means for operating the dishwasher in accordance with a predetermined operational sequence.

6. The invention of claim 5, wherein said sequence control means and said switch are electrically connected such that operation of said sequence control means can be interrupted by said sequence control means and can be resumed by operation of said switch sensor from said first position to said second position.

7. In an automatic dishwasher having a washing enclosure, means including an electrically-operated inlet valve for supplying liquid to the enclosure, and electrically-powered sequence control means for operating the dishwasher in accordance with a predetermined operational cycle, the improvement comprising:
   (a) a weight-sensitive electric switch electrically connected to the inlet valve and having its sensor fluid connected with the washing enclosure,
   (b) said switch sensor being operable between a first position opening the inlet valve and a second position closing the inlet valve,
   (c) said switch sensor being operable from said first position to said second position in response to liquid reaching a desired level in the enclosure,
   (d) the sequence control means being adapted to de-energize itself when the inlet valve is open,
   (e) said switch being electrically connected to the sequence control means whereby the sequence control means is re-energized by operation of said switch sensor from said first to said second position,
   (f) a control chamber, considerably smaller than the washing enclosure, surrounding said switch sensor, and
   (g) said control chamber having a stand pipe with an inlet opening communicating with the washing enclosure at an elevation equal to the desired level of liquid to be accumulated in the washing enclosure.

8. The invention of claim 7, wherein said switch is a single pole double throw switch having a first terminal electrically connected to the inlet valve and a second terminal electrically connected to the sequence control means.

9. The invention of claim 8, wherein:
   (a) said switch has a movable member,
   (b) said movable member engages said first terminal when said switch sensor is in said first position, and
   (c) said movable member engages said second terminal when said switch sensor is in said second position.

References Cited

UNITED STATES PATENTS

| | | | |
|---|---|---|---|
| 2,267,392 | 12/1941 | Bariffi | 137—428 X |
| 2,592,314 | 4/1952 | Morton | 137—387 |
| 2,869,347 | 1/1959 | Gray et al. | 68—207 |
| 3,125,105 | 3/1964 | Geiger. | |
| 3,133,433 | 5/1964 | Gebel | 68—207 X |

ALAN COHAN, Primary Examiner

D. R. MATTHEWS, Assistant Examiner

U.S. Cl. X.R.

68—207; 134—58; 137—407